CHARACTER PRINTER

Filed March 25, 1965

5 Sheets-Sheet 1

INVENTORS
GILBERT W. KING
DAVID F. LOEB
RICHARD A. MALIN

INVENTORS
GILBERT W. KING
DAVID F. LOEB
RICHARD A. MALIN

July 11, 1967 G. W. KING ETAL 3,330,191

CHARACTER PRINTER

Filed March 25, 1965 5 Sheets-Sheet 3

INVENTORS
GILBERT W. KING
DAVID F. LOEB
RICHARD A. MALIN

INVENTORS
GILBERT W. KING
DAVID F. LOEB
RICHARD A. MALIN

INVENTORS
GILBERT W. KING
DAVID F. LOEB
RICHARD A. MALIN

United States Patent Office 3,330,191

Patented July 11, 1967

3,330,191

CHARACTER PRINTER

Gilbert W. King, Weston, David F. Loeb, Wayland, and Richard A. Malin, Concord, Mass., assignors to Itek Corporation, Lexington, Mass., a corporation of Delaware Filed Mar. 25, 1965, Ser. No. 442,761

35 Claims. (Cl. 95—4.5)

ABSTRACT OF THE DISCLOSURE

This disclosure is directed to a projection system for optically projecting a particular family of characters for display or printout purposes. A particular column of families possess a first character characteristic whereas families in a particular row possess a second character characteristic. Two units of address data are utilized to position a plate bearing all of the families so that that particular family of characters possessing both the first and second character characteristic are optically retrieved. The operator, after visually inspecting the retrieved family, generates a further code which selects the exact character within the projected family which is either encoded upon a media such as a punched tape and/or printed upon a photosensitive media. Since the drive circuitry need only position a particular family of characters into the retrieval or projection area rather than selectively position the finally selected character, considerable simplification of the character plate positioning system is effected and, furthermore, the plate may generally be made smaller than would otherwise be the case.

Figures 1, 5, 6:
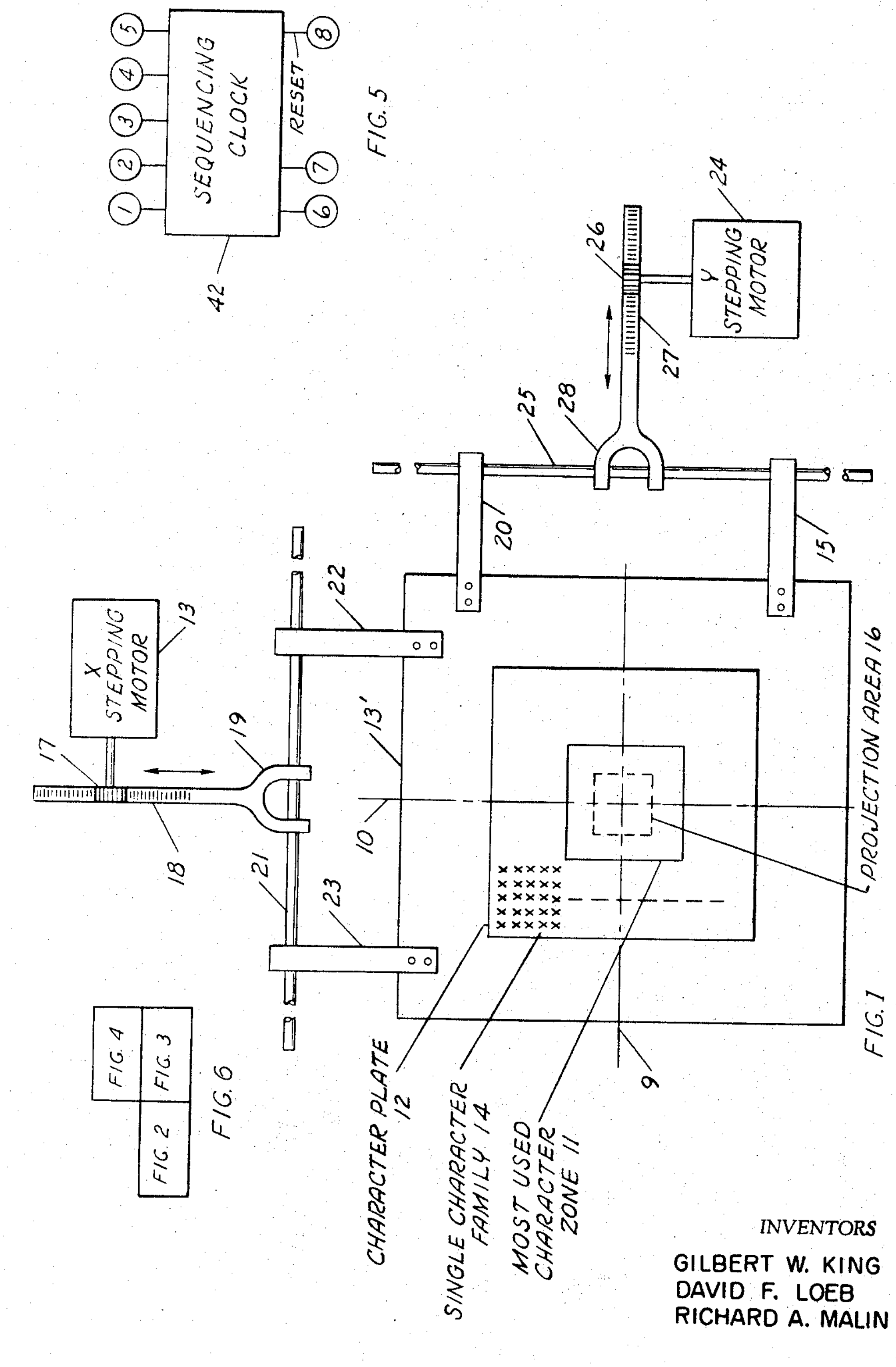

The present invention relates to data processors and more particularly to data processors for encoding and printing complex characters.

Languages such as Chinese and Japanese, in contrast with Western languages, comprise thousands of complex composite characters. Typing, typesetting, and encoding for telegraphic or computer (e.g., language translation), input has been very difficult in the past to perform. The problems involved in employing a nine-thousand-key keyboard or a telegraphers code book having thousands of entries, printing or typesetting these characters are readily apparent.

Lin Yutang in his U.S. Patent 2,613,795, which relates to a mechanical Chinese typewriter, teaches that Chinese characters may be grouped into families wherein each family contains characters having similar top and bottom stroke configurations. The actuation of a first key representing a desired top character configuration together with the actuation of a second key repreesnting a desired bottom character configuration causes a desired family of characters having the selected top and bottom stroke configurations to be associated with a typing position. A final selection of the desired character is made visually by the typist, by referring to a card indexing device, who causes a type bar to be rotated and the finally selected character to be printed. This complex mechanical machine includes 36 rotatable and selectively positionable type bars, each of which carries over two hundred character types, each type having formed thereon an individual Chinese character. This method of isolating or selecting one character out of thousands is analogous to the dialing of a three digit telephone number on a pushbutton telephone, to select one line circuit out of a thousand.

The subject invention is directed to an efficient and economical system for directly encoding, displaying on a selecting screen, and printing complex characters such as those characters comprising Chinese or Japanese. An operator who may know virtually nothing of the Chinese language, looks at the first character on a document to be encoded and printed. She actuates a first key which bears thereon a configuration of an upper portion of the character to be encoded and thereafter activates a second key which bears thereon a configuration of the lower portion of the character to be encoded. This action causes a visual display of various characters within that family of characters having these upper and lower segments or configurations in common. She then makes the final "matching" selection by actuating keys which identify the physical position of the characters with respect to the viewing field, and as a result the matched character is fully identified, encoded and printed.

In accordance with the present invention a photographic store or character plate containing a large number of groups or families of characters is positioned between a source of collimated light and an optical projection system. The projection or retrieval area which receives the concentrated beam of collimated light is small relative to the area of the character plate so that generally only one family occupies the projection or retrieval area at a particular time. Horizontal and vertical character plate driving means operating simultaneously are provided to selectively position a desired family occupying a particular XY coordinate on the character plate into the retrieval area in accordance with a pair of binary numbers which are generated by a keyboard encoder. All of the families within a particular row of families have a common upper segment character configuration, while all of the families within a particular column of families have a common lower segment character configuration. The operator actuates a key having the desired upper segment configuration to thereby insert a binary X address code into an X address register and then actuates a key having the desired lower segment character configuration to thereby insert a binary Y address code into a Y address code register. These codes thereafter control the character plate driving means which causes that family of characters having both the selected upper and lower character segments to be positioned within the retrieval area, which in turn enables the family to be optically projected at a viewing area. Although images of five rows of characters associated with this family are directed at a viewing screen, only those characters occupying the first row will be visible owing to a mask covering the viewing area, which mask contains a viewing window wide ennough to display only one row of characters. If the desired matched character identified by the operator is in the first row, a column key is actuated which causes a binary number indicative of the particular column occupied by the desired character to be inserted into a column register. A binary first row code is also manifested in a row counter at this time. The light bundle array representing the family occupying the projection area is horizontally shifted pursuant to the column code so that when a printer shutter is activated only the image of the selected first row character in the selected column will pass through the shutter and an aperture plate to be printed on a photographic "typewriter" drum. If the desired character is not present in the first row, the operator pushes a row sequence key which causes a "second row" binary number to be manifested in the row counter. This action causes the light bundle array to be shifted vertically to cause the second row of characters to be displayed through the window in the viewing mask, and to align the second row light bundles with the aperture plate associated with the photographic drum. If the desired character is in the second row, the column key is actuated as before to register the column identification code within the column register and to shift the light bundle array horizontally to selectively print the desired character. If the desired character is not in the second row, the sequence key is again actuated and the process set forth hereinabove is continued until the selected character is identified, encoded and printed. The upper and lower character segment codes which define a family, the row code, and column code which complete the character identification, and a character completion code are thereafter sequentially spilled out of the aforesaid registers and are punched on a tape or otherwise recorded. This tape is then utilized to address a Chinese dictionary to effect translation into another language in a manner which has nothing to do with the present invention. Since the projection or retrieval area occupied by the selected family is small relative to the area of the photographic character plate, a bright, uniform, concentrated, bundle of light rays representing only a single character family is presented to the optical system and accordingly the selected character may be directly printed photographically or otherwise, as by xerography. An alternate approach would be to illuminate the entire photographic plate and employ a selectively movable optical system such as a movable wedge arrangement to selectively position images of a particular family upon an optical target screen. Such an approach introduces chromatic aberrations which complicate photographic printing of a desired character on a photographic recording medium. Other disadvantages of such a system include severe light attenuation and dispersion, interference, cumulative prism tolerance problems and the lack of intense and uniform illumination of the entire photographic plate. Additionally the display of characters on the viewing screen is (likely) to be multicolored, distorted, and uneven. These problems have been eliminated by the optical readout arrangement of the present invention and the selected characters are clearly and distinctly manifested on the recording drum and on the viewing screen.

In accordance with the present invention the families are so arranged on the character plate so that the most frequently used characters occupy those families clustered about the central area of the plate so that the time required to position families containing 90 percent of the characters is less than 100 milliseconds. Additionally X and Y direction stepping of the character plate is performed simultaneously to further reduce access time. The final character selection at the viewing screen is made on a row by row basis rather than having the operator pick out the selected character from an entire field of up to 25 characters which is confusing, fatiguing, leads to selection errors and increases the selection time.

Since the system of the present invention utilizes a single store for all characters, the system may be converted from a Chinese to a Japanese encoder (for example) in a matter of minutes merely by changing the store and capping the encoder keys with rubber caps bearing Japanese character segments.

Accordingly, it is the principal object of the present invention to provide an efficient and economical system for encoding, displaying and printing complex characters, such as those characters which make up the Chinese language.

It is a further object of the present invention to provide a system for producing a display of a very large number of complex characters for encoding and printing purposes, which display is of uniform field intensity, which is bright and clean, and which is free from distortion and chromatic aberration.

It is a further object of the present invention to provide a sequential display of rows or groups of characters of a selected family to facilitate ease of final visual selection of a desired character to be encoded or printed.

It is yet a further object of the present invention to provide a system for encoding, displaying and printing complex characters which utilizes the same bundle of light rays representing a selected family of characters for both viewing and printing purposes.

It is yet a further object of the present invention to provide a system for encoding and printing complex characters in a first language which system may be easily and quickly converted to a system for encoding and printing complex characters in a second language.

It is yet a further object of the present invention to provide a system for encoding and printing complex characters where split second display of a desired family of characters may be readily obtained.

Other objects, features and advantages of the present invention will become apparent as the following description, taken in conjunction with the following drawings, proceeds:

FIGURE 1 discloses the character plate together with its positioning mechanisms.

Figure 2:
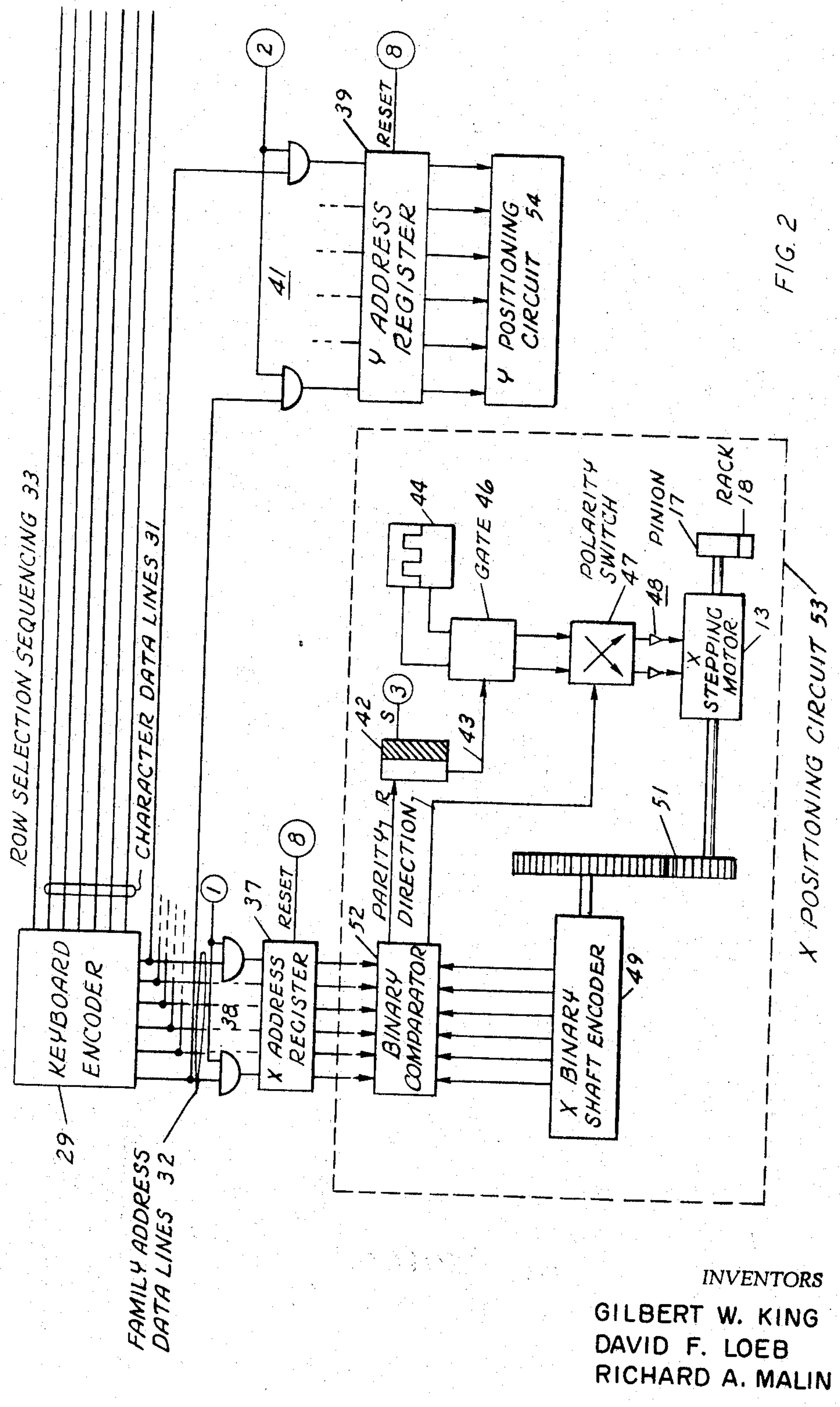

FIGURE 2 discloses a first portion of the electronic control circuitry.

Figure 3:
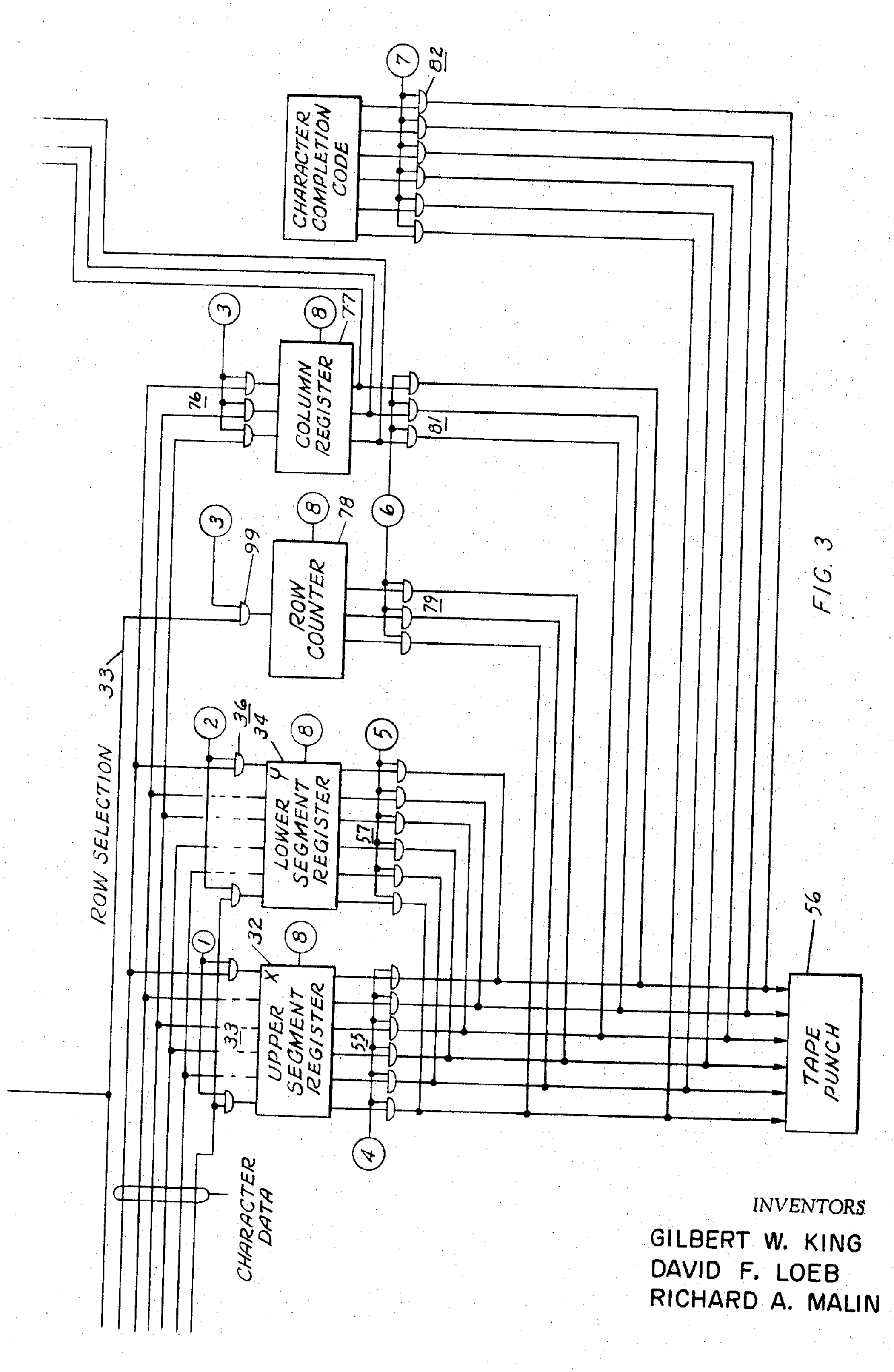

FIGURE 3 discloses a second portion of the electronic control circuitry.

Figure 4:
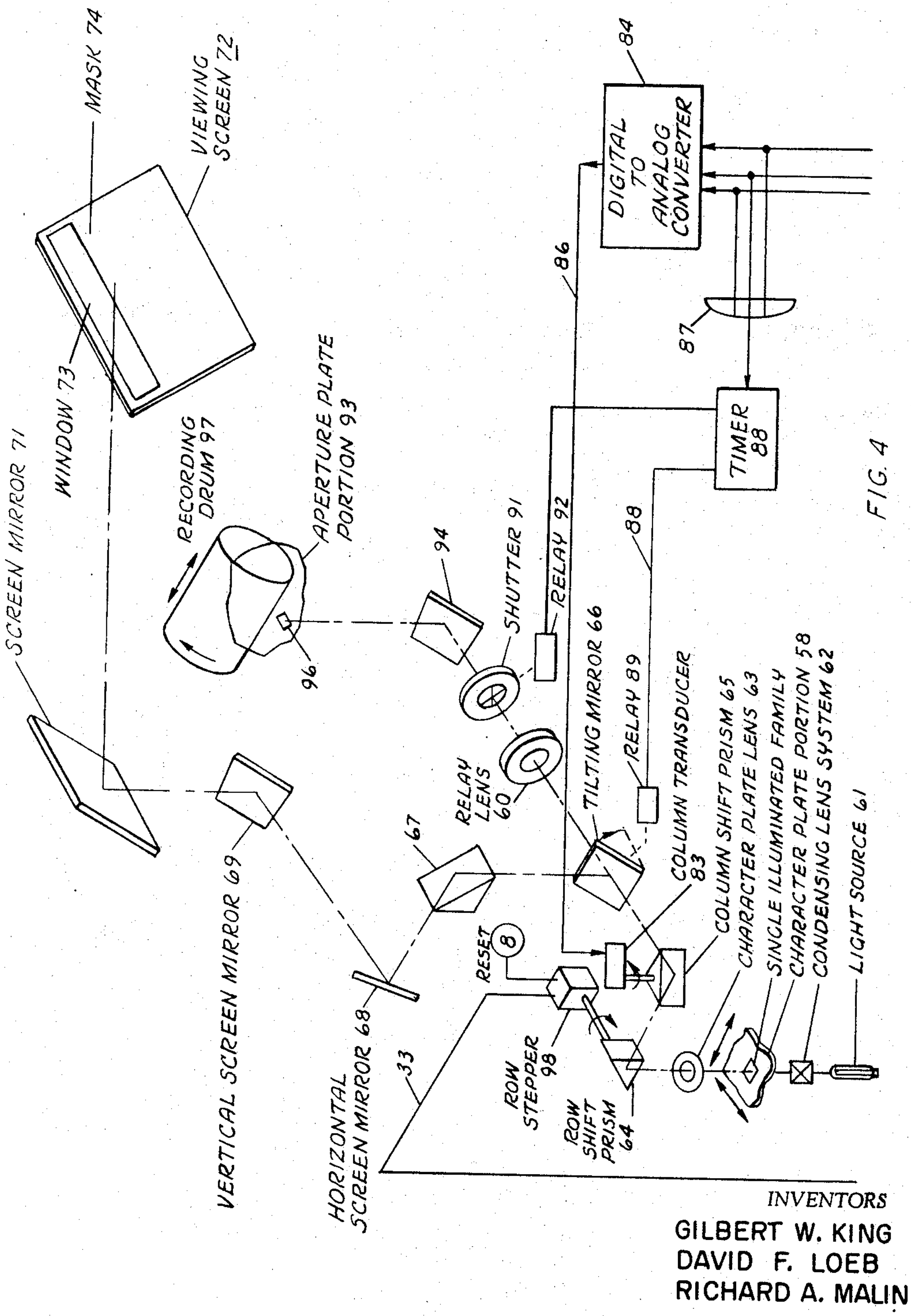

FIGURE 4 discloses the optical system of the present invention.

FIGURE 5 discloses schematically a sequencing device which controls the data transfer functions of the system of the present invention.

FIGURE 6 discloses a schematic drawing which indicates the manner of positioning FIGURES 2, 3, and 4 for inspection purposes.

Figure 7:
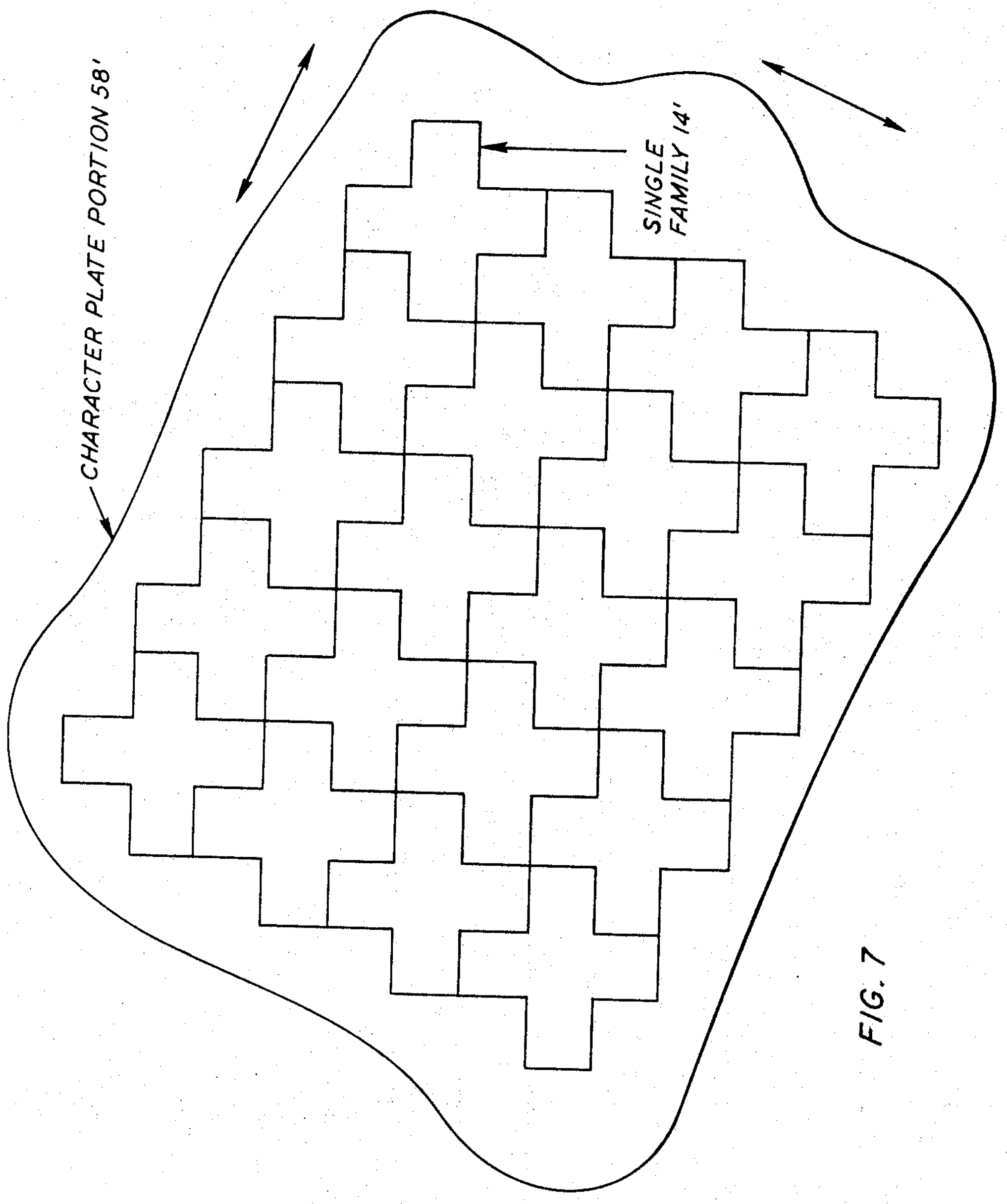

FIGURE 7 schematically discloses an alternate arrangement of manifestations of Chinese characters on the character plate.

FIGURE 1 discloses a character plate 12 which may take the form of an ultraflat glass photographic plate. The plate is divided into 1,296 positions or coordinates, thirty-six along the ordinate and thirty-six along the abscissa. Each of the thirty-six positions along the ordinate represent the address of an upper character stroke portion or pattern. Thirty-two of the thirty-six positions along the abscissa represent the address of a lower character stroke portion or pattern. At a coordinate or position represented by any combination of upper and lower stroke patterns is located a group of family of characters which have the same upper and lower stroke pattern. This group or family which may consist of up to 25 individual characters is arranged in a five by five matrix. The arrangement of the families on the plate is on a frequency of use basis, the most frequently used characters being positioned within families that are clustered about and occupy the central portion of the plate. This central portion is represented by a "most used" character zone 11 shown in FIGURE 1. As a result, average access time is kept to an absolute minimum. Photographic character plate 12 is bolted or otherwise attached to supporting plate 13 by any convenient method and may be readily removed. A single family of characters 14 is schematically illustrated. Projection or retrieval area 16 is also illustrated in an exaggerated manner at the central portion of character plate 12. Since there are 36 times 32 families of characters on the plate, it is obvious that the single character family 14 is considerably enlarged for purposes of illustration. X stepping motor 13 is mechanically coupled to supporting plate 13' via pinion 17, rack 18, yoke 19, bar 21, and arms 22 and 23. In like manner Y stepping motor 24 is mechanically coupled to support plate 13' through pinion 26, rack 27, yoke 28, bar 25, and arms 15 and 20. Arms 15, 20, 22, and 23 are rigidly affixed to support plate 13'. An upper character segment address code generated by the actuation of a character key on the keyboard, controls the X stepping motor 13 which in turn causes families having the desired upper segment to be positioned along horizontal axis 9. Substantially all of the families lying along axis 9 contain characters having the selected upper segment portion or pattern. The actuation of a lower segment key causes the Y stepping motor 24 to position in projection area 16, that family along axis 9 which contains characters having the desired lower segment. Accordingly, a family of characters having the selected upper and lower segments will be positioned within projection or retrieval area 16. Bars 21 and 25 are slidable relative to arms 22, 23, and 15, 20 respectively, so that the aforesaid X and Y stepping motions may be simultaneously performed to position the selected family within projection area 16. The circuitry utilized to control X stepping motor 13 and Y stepping motor 24 will be described hereinafter.

FIGURE 5 schematically discloses a clock or sequencing device 42 which causes a mark to be sequentially impressed upon its terminals to control the various data transfer and control functions explained hereinbelow.

The operator now looks at a particular Chinese character to be encoded and observes that the character possess an upper character portion which has a configuration which may be found on one of the keyboard encoder keys. By actuating the desired key a binary number is impressed upon character data lines 31, which number passes through and gates 33 which are now enabled during time interval one, by virtue of sequencing device 42, and is inserted into upper segment register 32. The actuation of this key also causes a particular binary number to be impressed upon family address data lines 32 which number will be inserted into X address register 37 by virtue of enabled and gates 38. Sequencing device 42 is now stepped to position 2 so that a mark is impressed upon the second terminal of the device while a mark is removed from the first terminal of the device. This action enables and gate bank 36 associated with lower segment register 34 and also enables and gate bank 41 associated with Y address register 39. The operator now observes that the character to be encoded possess a particular lower character stroke configuration. She then actuates that key on keyboard encoder 29 which bears this particular configuration and accordingly an associated family address data code is inserted into Y address register 39 via enabled and gate bank 41 and similarly a binary number representative of the particular lower segment of the character passes through enabled and gates 36 and is inserted into lower segment register 34. At this time it should be observed that upper segment register 32 and lower segment register 34 now contain binary information which identifies the family in which the character to be encoded will be found. X address register 37 and Y address register 39 contain binary information which will affect actuation of the aforesaid character plate 11 in the X and Y directions simultaneously, to thereby position that character family containing the character to be encoded within projection or retrieval area 16, shown in FIGURE 1. Since only projection area 16 is illuminated, the stage is now set for the visual readout of that character family containing the character to be encoded, as will be set forth hereinafter. Upon the actuation of sequencing device 42, terminal 3 will now become marked and a mark will be removed from terminal 2, and as a result flip-flop 42 of FIGURE 2 will be set, thereby to mark lead 43, which in turn causes the pulses produced by pulse train generator 44 to pass through gate 46. A polarity switch 47 is positioned between the output terminal of gate 46 and amplifiers 48 which in turn are coupled to the X direction stepping motor 13. As mentioned hereinbefore the X stepping motor 13 is coupled to a pinion 17 and rack 18 which provides means for driving or stepping character plate support means 13.

Besides being mechanically coupled to pinion 17 and rack 18, X stepping motor 13 is also coupled to X direction binary shaft encoder 49 through gears 51 as indicated in FIGURE 2. Accordingly, the X direction position of character plate 11 is readout in binary form by shaft encoder 49 and addresses binary comparator 52. These components are contained within the dashed box, which represents X positioning circuit 53, which constitutes a servosystem for selectively controlling the X direction position of the character plate, under the command of the binary address code which is contained within X address register 37. The X direction stepping motor will be stepped in one direction or the other depending upon the setting of polarity switch 47, as is well known to these skilled in the art. Binary comparator 52 is able to recognize whether or not the binary number contained within X address register 37 is higher or lower than the binary number produced by binary shaft encoder 49, and will actuate polarity switch 47 accordingly, via the "direction" lead interconnecting the two components. Should the output of shaft encoder 49 equal the output of Register 37 at the beginning of the third timing interval, flip-flop 42 will be clamped to the reset state, to prevent the passage of a single pulse through gate 46. When X direction steeping motor 13 causes the character plate to be positioned to that address indicated by the binary number within X address register 37, a mark is produced upon the parity lead of binary comparator 52, thereby to reset flip-flop 42 and disenable gate 46 to stop the motor. The character plate is positioned similarly by the Y address register 39 and Y positioning circuit 54 which contains the same components as those components within X positioning circuit 53. It is significant to note that rods 21 and 25 are slidable with respect to arms 15, 20, 22, and 23 so that the positioning of the character plate in the Y direction may be carried out simultaneously or in "push pull" fashion with the positioning of the character plate in the X direction. As a result of this innovation, family access time is considerably reduced. The selected family will thus trace a zigzag path rather than an L shaped path to the retrieval area. By dint of the operation of positioning circuits 53 and 54, it should now be apparent that the actuation of an upper and lower segment character key will cause that family of characters containing both of these segments in common to be positioned within projection or retrieval area 16, under the command of X and Y address binary codes which are derived from the actuation of these character keys.

Sequencing device 42 thereafter marks its fourth terminal to cause the binary code contained within upper segment register 32 to pass through enabled and gates 55 and be punched upon a tape by means of tape punch 56. Upon the advance of sequencing device 42 to the fifth position, and gates 57 are enabled to cause the lower segment code contained within register 34 to be punched upon the tape. Two six bit binary codes have now been punched upon the tape so that the particular family in which the character to be encoded is found, has been identified.

FIGURE 4 schematically discloses the printout and viewing portions of the encoding system of the present invention. A portion of character plate 11 is disclosed at the lower left hand corner of FIGURE 4. Character plate portion 58 will be selectively stepped to cause the desired family to be positioned with the data retrieval or projection area 16. If only four families are present on the character plate the retrieval area would be about 25 to 30 percent of the information bearing area of the character plate, whereas if one hundred families are present the retrieval area would be around 1 percent of the plate area. The optical system comprising light source 61, condensing lens system 62, transparent character plate portion 58, character plate lens 63, row shift prism 64, column shift prism 65, tilting mirror 66, prism 67, horizontal screen mirror 68, vertical screen mirror 69, screen mirror 71, and viewing screen 72, causes light rays manifesting a single selected illuminated family within the retrieval area to be projected at viewing screen 72. This optical system causes the characters within a single illuminated family to be magnified fifty-four times. The optical components are initially positioned so that only the first row of characters will be visible through window 73 of mask 74.

Five column keys are present on keyboard encoder 29, each of which is associated with a particular column.

If the character to be encoded is present in the first row, and hence visible through window 73, the operator at this time (third timing interval) presses the particular column key associated with the position of the selected character to be encoded. Since the third output terminal of sequencing device 42 will be marked, a binary number indicative of the particular column in which the character is found will pass through enabled and gates 76 into column register 77. A count indicative of "row one" is manifested at this time within row counter 78 since this counter is always reset (during the eighth timing interval) to one rather than zero. After the aforementioned spill out of the upper and lower character segment codes from registers 32 and 34, the three bit binary code indicative of "row one" will be spilled out of row counter 78 along with the three bit binary code identifying the column of the selected character. This action will occur when the sequencing device is in the sixth position since and gate banks 79 and 81 are enabled at this time. It should therefore be apparent that the particular character to be encoded has now been fully identified on the tape. A character completion code will thereafter be impressed upon the tape during the seventh stepping position of sequencing device 42 by virtue of the enabling of and gate bank 82. All of the registers in the system will thereafter be cleared upon the marking of the eighth terminal of sequencing device 42 during the eighth interval.

Column shift prism 65 may be rotated about its vertical axis by means of the operation of column transducer 83. Let it be assumed that the selected character is in the third column of the first row. The aforementioned column code passing through and gates 76 of FIGURE 3, is applied to digital to analog converter 84, which in turn causes a voltage having a magnitude of three units to be applied over lead 86 to column transducer 83. The column shift prism 65 is rotated through two angular steps to a third angular position so that the entire light bundle array manifesting the illuminated family is shifted in the X direction, which sets the stage for the printout of the character in the first row and in the third column. The application of the binary column code to digital analog converter 84, which is produced by the operator's actuation of the third column key, will also cause a mark to pass through or gate 87 thereby to actuate timer 88, which in turn applies a voltage to lead 88' to cause relay 89 to in turn cause tilting mirror 66 to be pivoted to the position indicated by the dotted lines of FIGURE 4. The light bundles manifesting the illuminated family are now directed at shutter 91. Timer 88 thereafter causes the energization of relay 92 which opens shutter 91 to thereby direct the light bundle at aperture plate portion 93 via mirror 94. Since column shift prism 65 has assumed the third angular position, only the selected character in the first row and the third column will pass through aperture 96 to be recorded upon movable "typewriter" recording drum 97. Movable recording drum 97 carries a photographic film which will now have recorded thereon an image of the selected character. Movable recording drum 97 will now be actuated so that the next encoded character is not photographically superimposed on the character just recorded. The control means for driving recording drum 97 are not shown since they form no part of the present invention. It is obvious to one skilled in the art that many circuits may be utilized to properly actuate the "typewriter" recording drum.

Now let it be assumed that the desired character to be encoded is not found by the operator in the first row of the illuminated family positioned within the retrieval or projection area 16. The operator now presses a row selection sequencing key which causes a mark to be impressed upon row selection sequencing lead 33, shown in FIGURES 2, 3, and 4. Conductor 33 is coupled to row stepper 98. Since this lead is also coupled to row counter 78 via and gate 99, the aforesaid "row one" count within row counter 78 is increased by one so that during the sixth stepping interval a "row two" code is fed to tape punch 56 to indicate that the selected character is in the second row rather than the first row, if such should be the case. The marking of row sequencing conductor 33 causes row stepper 98 (which could be an ordinary pawl-ratchet-electromagnet configuration) to be actuated, thereby to rotate row shift prism 64 through a predetermined angle, which action in turn shifts the entire light bundle, representing the single illuminated family, in such a manner so that the second row of characters will now be seen through window 73 of mask 74. If the desired character to be encoded is found in this second row, the particular column key associated with that column containing the desired character is actuated as before and the stage is set for reading out the column code to the tape punch 56 via and gates 81, as explained hereinbefore. The actuation of row shift prism 64 will cause the encoded character in the second row and the third column to be directed at aperture 96 of the print-out mechanism rather than a first row character.

The actuation of tilting mirror 66 and the functions of relay lens 60, shutter 91, mirror 94, aperture 96, and recording drum 97 is otherwise the same as in first row printing. The eighth reset terminal of sequencing device 42 is connected to row stepper 98 so that this device is reset along with the various registers discussed hereinabove.

It should now be apparent that the light rays which manifest the single illuminated family contained within the data retrieval or projection area and focused by lens 63, are selectively deflected by virtue of the incremental rotation of row shift prism 64 and column shift prism 65. The actuation of row shift prism 64 about the horizontal axis causes the entire array of light bundles to be shifted in the vertical direction relative to the screen thereby to sequentially cause the rows of characters to be presented to the operator, and to set the stage for the printout of the desired character in the appropriate row. The incremental rotation of column shift prism 65 about the vertical axis causes the light bundles to be moved in the horizontal direction relative to viewing screen 72 so that only that character in the appropriate column actually passes through aperture 96 to be recorded on recording drum 97.

FIGURE 7 schematically discloses manifestations of families 14' of five characters each, arranged in the form of Greek crosses upon character plate portion 58'. It is thought that five character families may occasionally be desirable. In this case the Greek cross arrangement of FIGURE 7 results in a very high character density upon the plate, and provides a most efficient use of the circular field of the character reading lens, which could be an objective lens of a microscope where a very high resolution emulsion is employed on the plate. The circular field just encompasses the cross. A mask would be placed over the aforesaid viewing screen having a window shaped in the manner of a Greek cross to mask out characters in adjacent families.

It cannot be too strongly emphasized that only a single illuminated character family is presented to the optical system so that a uniform and concentrated array of light rays representing this family may be recorded and displayed. As a result of the selective operation of the row and column shift prisms, this bundle of light rays may be selectively positioned in orthogonal directions so that those light rays manifesting only the selected character may be directly applied to the photographic or xerographic medium via shutter 91 and aperture 96. Additionally, a small condensing lens system may be utilized thereby to eliminate all of the disadvantages mentioned earlier in connection with other approaches. In other words, we are directly photographing a selected character from a uniform and highly intensified array of light beams which is produced by dint of illuminating only a single family of characters.

Additionally, by providing means for sequentially presenting rows of characters within the single illuminated family to the viewing screen, the aforesaid problem of operator fatigue and slow visual selection associated with the simultaneous presentation of up to twenty-five characters has been eliminated.

The term "character" is intended to include any set of marks or configurations and therefore should not be limited to oriental language characters, while "optics" includes electron optics.

While there has been described what is at present considered to be the preferred embodiment of this invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. In a system for encoding one of a large number of characters at least some of which have first and second character portions:

(a) storage means bearing manifestations of families of said characters, all of the characters in at least some of the families of a first given group of families having similar first character portions and all of the characters in at least some of the families of a second given group of families having similar second character portions;

(b) character presentation means;

(c) a data retrieval area small relative to the area of said storage means bearing manifestations of said families;

(d) retrieval means for directly reading data off of said storage means only within said retrieval area and for transmitting the read data representative of that family common to both of said groups and occupying said retrieval area to said character presentation means, where the characters of that family occupying said retrieval area may be manifested;

(e) and means for selectively creating relative movement between said storage means and said retrieval means to selectively position at least one desired family of characters within said data retrieval area.

2. The combination as set forth in claim 1 wherein said character presentation means further includes means for sequentially displaying portions of a family occupying said data retrieval area.

3. The combination as set forth in claim 2 further including means for manifesting information indicative of how many portions of a particular family have been sequentially displayed by said character presentation means.

4. The combination as set forth in claim 1 wherein those families of characters containing the most used characters are manifested in the central region of said storage means.

5. The combination as set forth in claim 1 wherein said storage means takes the form of a flat plate.

6. The combination as set forth in claim 4 wherein said storage means takes the form of a flat plate.

7. The combination as set forth in claim 1 wherein said last named means comprises means for selectively producing said relative movement in one of a large number of zigzag paths.

8. The combination as set forth in claim 1 wherein at least some of said families comprise manifestations of characters arranged in the form of Greek crosses.

9. In a system for encoding one of a large number of characters, at least some of which have first and second character portions:

(a) storage means bearing manifestations of rows and columns of families of said characters, all of the characters in at least some of the families of a given row having similar first character portions and all of the characters in at least some of the families of a given column having similar second character portions;

(b) character presentation means;

(c) a data retrieval area small relative to the area of said storage means bearing manifestations of rows and columns of said families;

(d) retrieval means for directly reading data off of said storage means only within said retrieval area and for transmitting the read data representative of that family occupying said retrieval area to said character presentation means, where the characters of that family occupying said retrieval area may be manifested;

(e) and means for selectively creating relative movement between said storage means and said retrieval means to selectively position at least one desired family of characters within said data retrieval area.

10. The combination as set forth in claim 9 wherein said character presentation means further includes means for sequentially displaying portions of a family occupying said data retrieval area.

11. The combination as set forth in claim 10 further including means for manifesting information indicative of how many portions of a particular family have been sequentially displayed by said character presentation means.

12. The combination as set forth in claim 9 wherein those families of characters containing the most used characters are manifest in the central region of said storage means.

13. The combination as set forth in claim 9 wherein said storage means takes the form of a flat plate.

14. The combination as set forth in claim 12 wherein said storage means takes the form of a flat plate.

15. The combination as set forth in claim 9 wherein said last named means comprises a pair of drive means which operate concurrently in substantially orthogonal directions to produce said relative movement.

16. The combination as set forth in claim 9 wherein at least some of said families comprise manifestations of characters arranged in the form of Greek crosses.

17. In a system for encoding one of a large number of characters, at least some of which have first and second character portions:

(a) storage means bearing manifestations of families of said characters, all of the characters in at least some of the families of a first given group of families having similar first character portions and all of the characters in at least some of the families of a second given group of families having similar second character portions;

(b) projection means for visually displaying images of at least one family of said characters;

(c) a data retrieval area small relative to the area of said storage means bearing manifestations of said families;

(d) optical retrieval means for coacting with said retrieval area and for producing a bundle of rays which are shaped in accordance with a selected family of characters common to both of said groups and occupying said retrieval area;

(e) directing means for directing said bundle of rays at said projection means;

(f) and means for selectively creating relative movement between said storage means and said optical retrieval means to selectively position at least one desired family of characters within said data retrieval area, thereby to enable the projection of said desired family by said projection means.

18. The combination as set forth in claim 17 wherein said directing means further includes means for shifting the position of said bundle of rays with respect to said projection means.

19. The combination as set forth in claim 18 further including means for manifesting information indicative of the degree of said shifting.

20. The combination as set forth in claim 17 wherein those families of characters containing the most used characters are manifested in the central region of said storage means.

21. The combination as set forth in claim 17 wherein said storage means takes the form of a flat plate.

22. The combination as set forth in claim 20 wherein said storage means takes the form of a flat plate.

23. The combination as set forth in claim 17 further including a printing mechanism and means for diverting said bundle of rays away from said projecting means and toward said printing mechanism.

24. The combination as set forth in claim 17 wherein said last named means comprises means for selectively producing said relative movement in one of a large number of zigzag paths.

25. The combination as set forth in claim 17 further including a printing mechanism, said printing mechanism further including a printing media and an aperture plate coacting therewith, the aperture in said plate being capable of passing a group of rays of said bundle representative of only a single character of said family of characters occupying said retrieval area, means for directing said bundle at said printing mechanism, and means for selectively moving said bundle with respect to said printing mechanism so that only a selected group of rays of said bundle passes through said aperture to be printed by said printing mechanism.

26. In a system for encoding one of a large number of characters, at least some of which have first and second character portions:

(a) storage means bearing manifestations of rows and columns of families of said characters, all of the characters in at least some of the families of a given row of families having similar first character portions and all of the characters in at least some of the families of a given column of families having similar second character portions;
(b) projection means for visually displaying images of at least one family of said characters;
(c) a data retrieval area small relative to the area of said storage means bearing manifestations of families of said characters;
(d) optical retrieval means for coacting with said retrieval area and for producing a bundle of rays which are shaped in accordance with a selected family of characters occuping said retrieval area;
(e) directing means for directing said bundle of rays at said projection means;
(f) and means for selectively creating relative movement between said storage means and said optical retrieval means to selectively position at least one desired family of characters within said data retrieval area, thereby to enable the projection of said desired family by said projection means.

27. The combination as set forth in claim 26 wherein said directing means further includes means for shifting the position of said bundle of rays with respect to said projection means.

28. The combination as set forth in claim 27 further including means for manifesting information indicative of the degree of said shifting.

29. The combination as set forth in claim 26 wherein those families of characters containing the most used characters are manifested in the central region of said storage means.

30. The combination as set forth in claim 26 wherein said storage means takes the form of a flat plate.

31. The combination as set forth in claim 29 wherein said storage means takes the form of a flat plate.

32. The combination as set forth in claim 26 further including a printing mechanism and means for diverting said bundle of rays away from said projecting means and toward said printing mechanism.

33. The combination as set forth in claim 26 wherein said last named means comprises a pair of drive means which operate concurrently in substantially orthogonal directions to produce said relative movement.

34. The combination as set forth in claim 26 further including a printing mechanism, said printing mechanism further including a printing media and an aperture plate coacting therewith, the aperture in said plate being capable of passing a group of rays of said bundle representative of only a single character of said family of characters occupying said retrieval area, means for directing said bundle at said printing mechanism, and means for selectively moving said bundle with respect to said printing mechanism so that only a selected group of rays of said bundle passes through said aperture to be printed by said printing mechanism.

35. In a system for encoding one of a large number of characters, at least some of which have first and second character portions:

(a) a flat storage plate bearing manifestations of rows and columns of families of said characters, all of the characters in at least some of the families of a given row of families having similar first character portions and all of the characters in at least some of the families of a given column of families have similar second character portions;
(b) projection means for visually displaying images of at least one family of said characters;
(c) a data retrieval area small relative to the area of said flat storage plate bearing manifestations of families of said characters;
(d) optical retrieval means coacting with said retrieval area for producing a group of light rays which are shaped in accordance with the selected family of characters occupying said retrieval area;
(e) directing means for directing said group of light rays at said projection means;
(f) means for selectively creating relative movement between said flat storage plate and said optical retrieval means to selectively position at least one desired family of characters within said data retrieval area to enable the projection of said desired family by said projection means;
(g) said directing means further including means for shifting the position of said group of light rays together with,
(h) means for manifesting information indicative of the degree of said shifting.

References Cited

UNITED STATES PATENTS

| | | | |
|---|---|---|---|
| 2,699,101 | 1/1955 | Ferguson | 95—4.5 |
| 2,950,800 | 8/1960 | Caldwell | 197—1 |

JOHN M. HORAN, *Primary Examiner.*